United States Patent [19]

Rodiger et al.

[11] Patent Number: 4,991,084
[45] Date of Patent: Feb. 5, 1991

[54] N×M ROUND ROBIN ORDER ARBITRATING SWITCHING MATRIX SYSTEM

[75] Inventors: William K. Rodiger, Kingston; Jon E. Thorson, Poughkeepsie; Yee-Ming Ting, Port Ewen, all of N.Y.

[73] Assignee: International Business Machines Corporation, Armonk, N.Y.

[21] Appl. No.: 152,779

[22] Filed: Feb. 5, 1988

[51] Int. Cl.⁵ .................. G06F 13/14; G06F 13/18; G06F 13/00; G06F 15/16
[52] U.S. Cl. .................. 364/200; 364/900; 364/228; 364/243.1; 364/243; 364/242.6; 364/242.91; 364/931.4; 364/964.7; 364/935.41; 364/937.01
[58] Field of Search ... 364/200 MS File, 900 MS File, 364/131, 134; 370/62, 85.2; 340/826, 825.5; 379/195, 272; 365/230.05

[56] References Cited

U.S. PATENT DOCUMENTS

| | | | |
|---|---|---|---|
| 4,314,335 | 2/1982 | Pezzi | 364/200 |
| 4,353,066 | 10/1982 | Inomata et al. | 340/825.96 |
| 4,360,809 | 11/1982 | Bourgonje | 340/825.86 |
| 4,417,245 | 11/1983 | Melas et al. | 340/825.8 |
| 4,473,880 | 9/1984 | Budde et al. | 364/200 |
| 4,488,218 | 12/1984 | Grimes | 364/200 |
| 4,499,538 | 2/1985 | Finger et al. | 364/200 |
| 4,609,928 | 8/1986 | Georgiou | 340/825.94 |
| 4,706,150 | 11/1987 | Lebizay et al. | 379/272 |
| 4,807,184 | 2/1989 | Shelor | 364/900 |

Primary Examiner—Michael R. Fleming
Assistant Examiner—Gopal C. Ray
Attorney, Agent, or Firm—Robert L. Troike; George E. Clark

[57] ABSTRACT

An N×M matrix adapted to couple N inputs from N processor to M basic storage modules is disclosed. The system includes arbitrators and gating means for each output responsive to request signals for simultaneously coupling data from a plurality of processors to requested basic storage modules under arbitrator control.

9 Claims, 4 Drawing Sheets

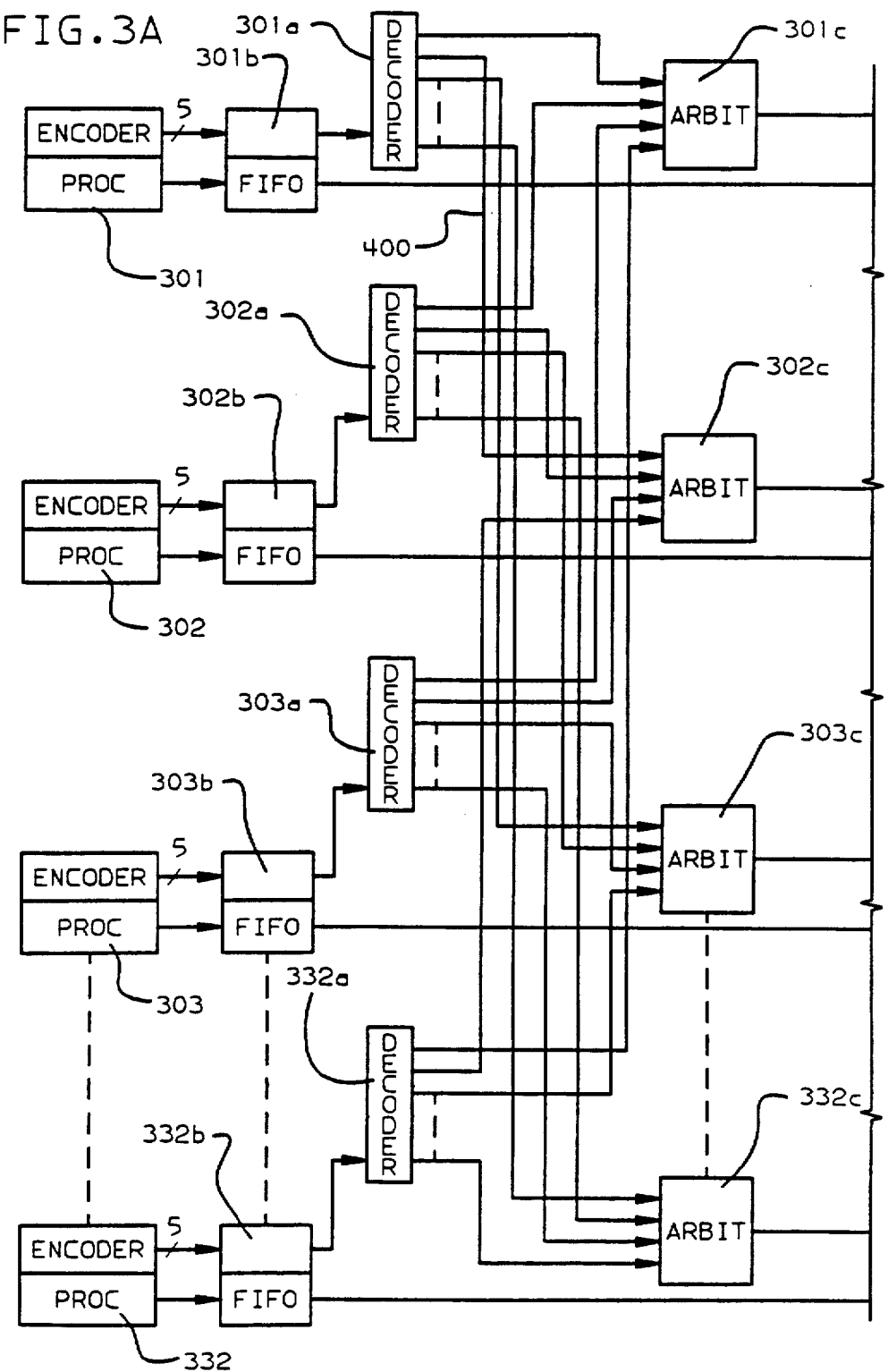

N×M ARBITRATING ROUND ROBIN ORDER SWITCHING MATRIX SYSTEM

BACKGROUND OF THE INVENTION

This invention relates to multiprocessing systems and more particularly to an arbitration system for handling requests for access from a plurality of inputs to a plurality of outputs.

It is desirable in large complex computer systems to have multiple memories or basic storage modules (BSM) and have multiple processors communicating with multiple memories with buffering.

In the prior art, there is known arbitrating systems such as in U.S. Pat. No. 4,473,880 of Budde, et al or U.S. Pat. No. 4,499,538 of Finger, et al that provide some form of arbitration system to several processors or microprocessors with a common bus. These arbitration systems with a common bus are relatively slow systems in that only an input to the bus from one unit can be applied via the bus to an output unit in a given time cycle. Cross point switches such as in a switching matrix as described in U.S. Pat. No. 4,417,245 of Melas, et al couple multiple inputs to multiple outputs simultaneously provided a given input does not want to conflict with another given input at the same output and assumes that some form of separate control is provided. There is no arbitrator involved.

SUMMARY OF THE INVENTION

According to one embodiment of the present invention, a plurality of input signals comprising data and associated output request code are selectively applied to one of a plurality of outputs with an arbitrator and gating means controlling each of the outputs. The arbitrators and gating means are responsive to the input signals for gating the noncontending input signals simultaneously to the noncontending outputs and for sequencing any contending signals to the associated outputs.

DESCRIPTION OF DRAWING

In the drawing:

FIGS. 3A and 3B are a block diagram of a preferred manner of extending the system of FIG. 1 in accordance with the present invention for additional processors and/or memories.

DESCRIPTION OF PREFERRED EMBODIMENT

Figure 1:
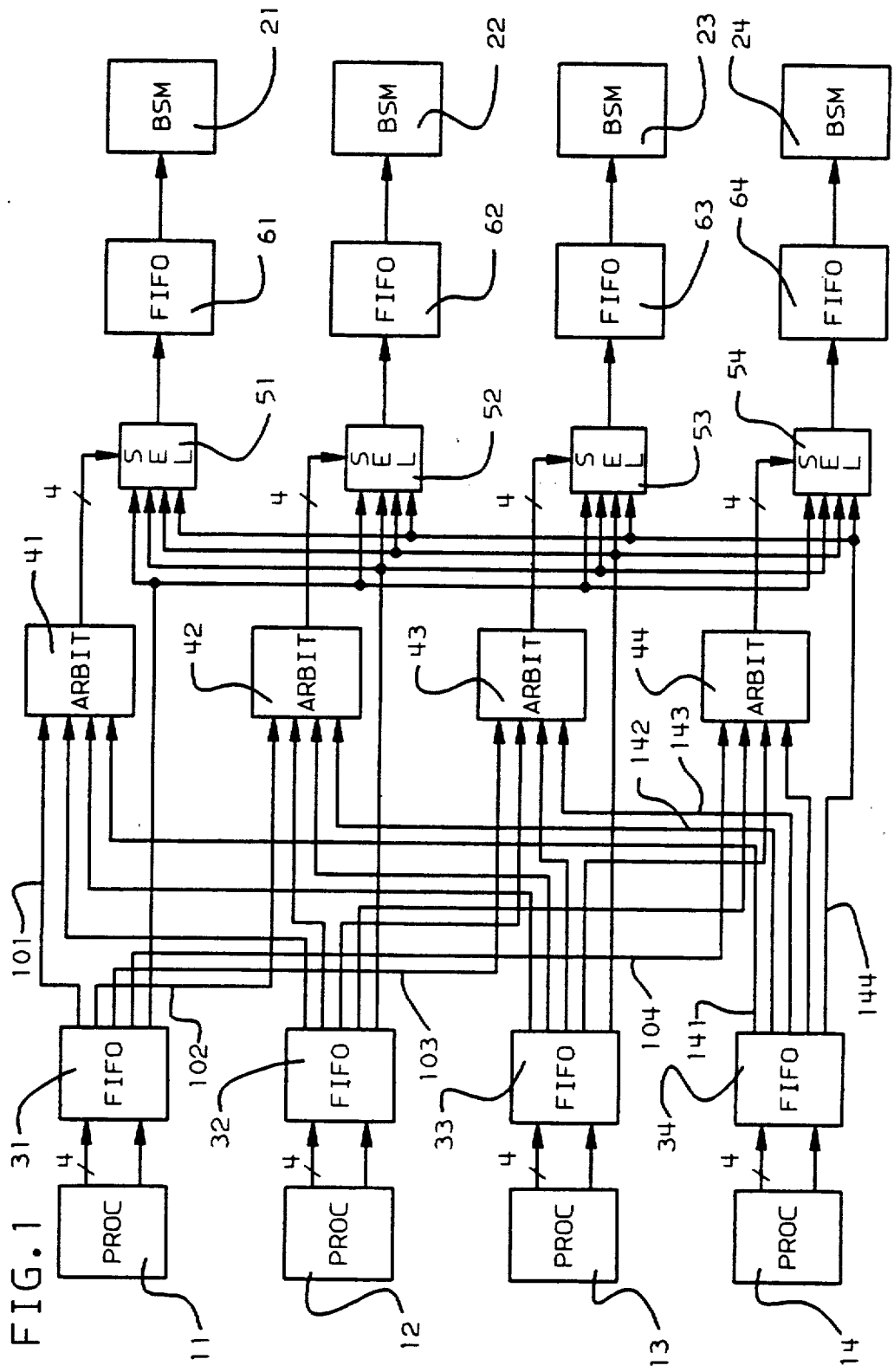
FIG. 1 is a block diagram of an overall system according to one embodiment of the present invention.

Referring to the system block diagram of FIG. 1, there is illustrated for example N×M arbitrating nonblocking high bandwidth switch according to one preferred embodiment of the present invention. The system shown in FIG. 1 refers to processors 11 through 14 being selectively coupled to one of four basic storage modules (BSM) 21 through 24. In actual practice, the number of processors connected to basic storage may be 32 or greater. The inputs from the processors 11 through 14 are applied to respective buffers 31 through 34. These buffers 31 through 34 may be for example FIFO (First In, First Out) buffers. The output from each of the processors 11 through 14 includes a request code signal and associated data signals or data packet. The request code signal could be simply a logic 1 level at one of the four lead wires. The output request code signal from each of the buffers 31 through 34 is applied to each of four arbitrators 41 through 44. The request code signal and associated data signals or data packet are sequenced together through the buffers 31 through 34. The request code signal could be via four wires or lines, with only one of the four wires being at a logic 1 level and the other three wires being at a logic zero level. The logic 1 level may be five volts where the logic zero may be at ground potential. If, for example, processor 11 wants to be coupled to BSM 21, the processor 11 provides a logic 1 level on lead 101 from buffer 31 and logic 0 level to leads 102 through 104 at the first request ports of arbitrators 42 through 44. If processor 11 wants to be coupled to BSM 22, BSM 23, or BSM 24, the logic 1 level would only be on line 102, 103, or 104 respectively. Likewise, if processor 14 requests to be coupled to BSM 21, BSM 22, BSM 23, or BSM 24, the logic 1 level would only be on line 141, 142, 143, or 144 respectively. Likewise, processors 12 and 13 can be coupled to any one of the basic BSM modules 21 through 24 by appropriate logic 1 level at the request line to arbitrators 41 through 44 respectively.

Each arbitrator first determines if there is an input from any of the four FIFO buffers 31 through 34. If there is more than one input to that arbitrator, it sequences the data inputs each clock cycle through an associated selector 51 through 54. The data is sent to all four selectors 51 through 54. If there are no contentions or more than one processor trying to use a given storage module at the arbitrator, the input from each buffer 31 through 34 at each selector 51 through 54 is simultaneously coupled to the associated BSM 21 through 24 via associated buffer 61 through 64. Selectors 51 through 54 are associated with each of the BSM 21 through 24. The arbitrator 41 through 44 identify which output BSM 21 through 24 the input data from a given processor is to be applied and provide a select code to the selectors 51 through 54 to gate the data from buffers 31 through 34 to the appropriate one of buffers 51 through 64.

If there is more than one contender for a given BSM, one of the arbitrators 41 through 44 associated with a given BSM determines the sequence out of the associated selectors 51 through 54. For example, if there is a request code signal from processor 11 and from processor 12 via buffers 31 and 32 for BSM 21, they are both applied to the arbitrator 41. The arbitrator 41 provides, for example, a first select code to the selector 51 during the first clock pulse to gate the output from the FIFO buffer 31 through the selector 51 to buffer 61 and to the BSM 21. During the next clock cycle, the second select signal code is provided to selector 51 and processor 12 data at buffer 32 is coupled through the selector 51 to the BSM Module 21.

Figure 2:
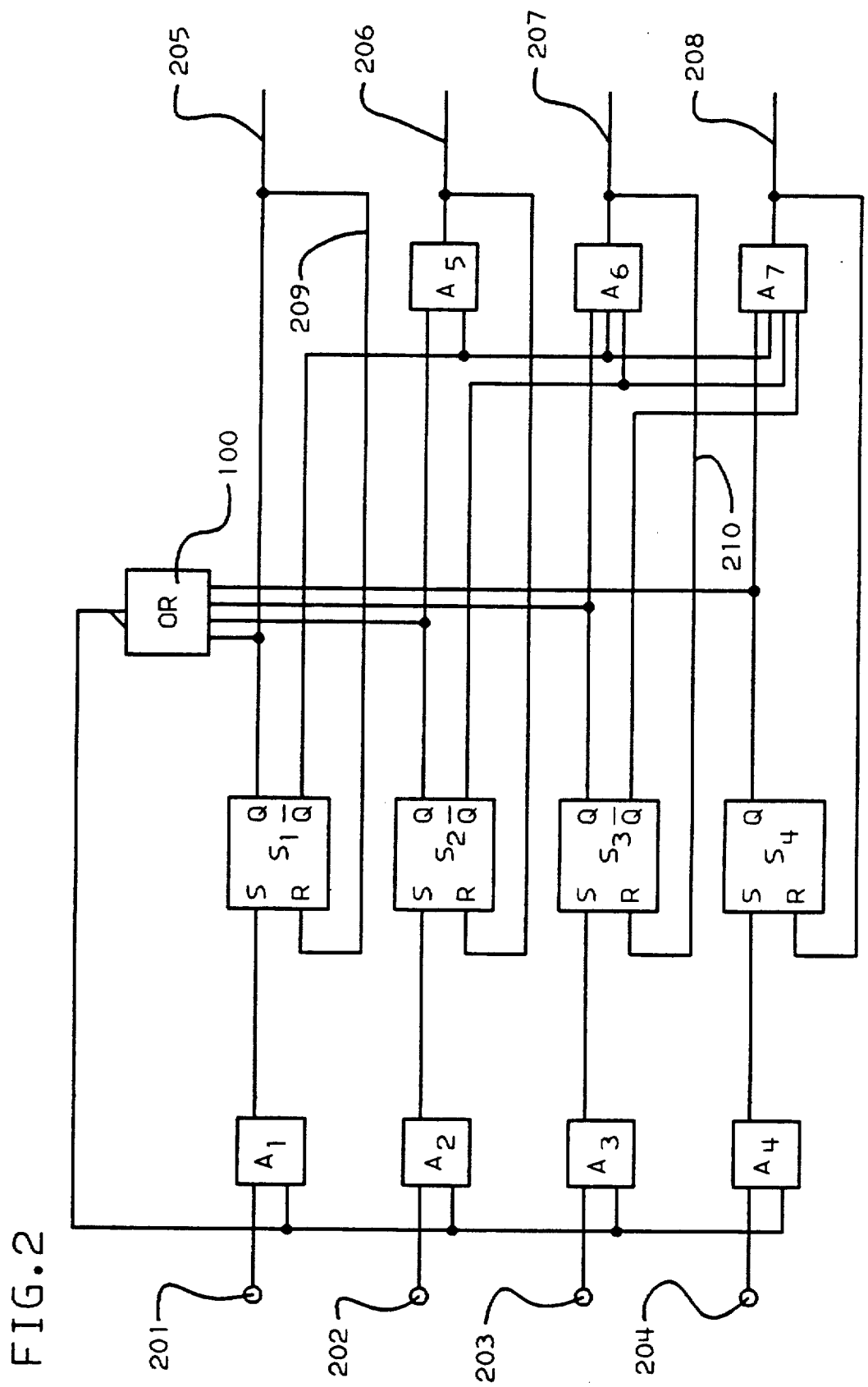
FIG. 2 is a block diagram of an arbitrator according to one embodiment of a present invention.

In FIG. 2, there is illustrated a logic block diagram for each arbitrator of FIG. 1. There are four input request ports 201 through 204 for each arbitrator 41 through 44. The first input port 201 is coupled to processor 11 via buffer 31. For arbitrator 41, this input port 201 is coupled via wire lead 101. The second input port 202 is coupled to processor 12 via buffer 32, the third port 203 is coupled to processor 13 via buffer 33 and the fourth port 204 is coupled to processor 14 via buffer 34. The request at inputs 201 through 204 are applied to the respective AND gates A1 through A4. The outputs from aND gates A1 through A4 are applied to the set inputs of flip-flop registers S1 through S4. The Q output from register S1 is applied directly to the output lead 205 and to NOR gate 100. The Q outputs from the registers S2 through S4 are also applied to the NOR gate 100. The $\overline{Q}$ output of switching register S1 is applied to AND Gate A5. The Q output from register S2 is also applied to the AND gate A5. The Q output of switches S3 and S4 are coupled to the respective inputs of AND Gates A6 and A7. AND Gate A6 also receives the $\overline{Q}$ output from registers S1 and S2. AND Gate A7 receives a $\overline{Q}$ output from registers S1, S2 and S3 and the Q output from register S4. The Q output from switch S1 is applied to the reset input of switch S1. The output of AND Gate A5 is coupled to the reset input of register S2. The output of AND Gate A6 coupled to the reset input of register S3 and the output of AND Gate A7 is coupled to the reset input of register S4. The outputs of AND Gates A5 through A7 on leads 206 through 208 and the Q output of register S1 on lead 205 provide a four-bit address code which is applied to the corresponding selector 51 through 54 to select the output. In actual practice for the simple embodiment of FIG. 1 with only four processors and four BSM modules that one of the arbitrator outputs 205 through 208 having a logic 1 level would enable the associated processor data tot he associated basic storage module. For example, if the output from register S1 is at the logic 1 level, the processor 11 output will be coupled to the basic storage module associated with the arbitrator. If at arbitrator 41, processor 11 data would be coupled to BSM 21. If at arbitrator 42 processor 11 data is coupled to BSM 22, if at arbitrator 43 processor 11 data is coupled to BSM 23, and if at arbitrator 44 processor 11 data is coupled to BSM 24. If at arbitrator 41 there is a logic 1 level at output 208 of arbitrator 41, the data from processor 14 would be coupled to the basic storage module 21. If the logic 1 level is at output 208 of arbitrator 42, the data from processor 14 is coupled to BSM 22. If at arbitrator 43 from processor 14 to BSM 23, etc.

In the start-up state of the arbitrator, there are all logic zeros at the Q outputs and logic 1 levels at the $\overline{Q}$ outputs of registers S1 through S4. The NOR Gate 100 provides a logic 1 level to AND Gates A1 through A4 with all zeros at its input. If there is only a request or logic 1 level at input 202, for example, this output enables AND Gate A2 with a logic 1 coupled to the set input of switch S2 to thereby provide a logic 1 level at the Q output of register S2. The logic 1 level output from register S2 is coupled to the NOR Gate 100 and in response to this logic 1 a logic low or zero level from NOR Gate 100 is provided to AND Gates A1 through A2, stopping all further requests. The logic 1 level input at AND Gate A5 from register S2 enables the logic 1 level input from the $\overline{Q}$ output of register S1 to provide a logic 1 level at the output 206. This code with a logic 1 level only on lead 206 requests the selector 51 through 54 associated with the arbitrator to couple the data from the second processor 12 to the basic storage module associated with the selector. For example, with arbitrator 41 the data from processor 12 is coupled to BSM 21.

A contention exists when there are two or more requests for a given BSM. For example, in the analysis, consider requests at inputs 201 and 203 from processors 11 and 13 for BSM 21. The arbitrator 41 sees the presence of a logic 1 level at AND Gates A1 and A3 to enable the logic 1 from NOR Gate 100 to produce a set of logic 1 levels at the set inputs of registers S1 and S3. This produces a logic 1 level at the Q outputs of registers S1 and S3. The presence of the logic 1 level at either or these "Q" outputs of the NOR Gate 100 provides a logic "0" at the AND Gates A1 through A4 which stops any further requests. A logic zero or low level is provided from the $\overline{Q}$ outputs of registers S1 and S3 to the AND Gates A5 through A7. AND Gate A6 output remains at a logic zero with the $\overline{Q}$ output from register S1 beign low. In effect, only the request at input 201 for BSM 21 is acknowledged at the first clock cycle. As soon as the select is made to couple the data from processor 11, the register S1 is reset via lead 209 providing a logic one at the $\overline{Q}$ output of register S1 to AND gate A6 and allowing the request at input 203 to provide a logic 1 from AND gate A6. This logic 1 at output 207 of AND gate A6 selects the data then from processor 13 to the associated BSM on the next clock cycle. After the requestor at input 203 selects the data, register S3 is reset by the feedback path 210 from AND gate A6 and the NOR output from NOR Gate 100 goes high. When the NOR Gate output goes high, all of the registers S1 through S4 are off and any combination of input request can be acknowledged in the next full cycle.

In the example given in FIGS. 1 and 2, there were two clock cycles required to handle two simultaneous requests for the given basis storage module. Since port requests are generated every cycle, the storage fo the input buffers should equal the number of processors. For example, in FIG. 1 this would require four buffer stages to cover the case where all four processors would be attempting to communicate with a given basic storage module. They would be stored and sequenced over four clock cycles. In the example given, there were only four inputs processor coupling to four basic storage modules, but in a preferred application there would be, for example, 32 processors communicating with 32 or more storage modules.

The arbitrators as shown in FIG. 2 always acknowledge multiple requests in round robin order of S1 through S4 until all are satisfied; that is, in instant case the request at input 201 has the highest priority with request at input 202 second, input at 203 third and input at 204 having the lowest priority within that arbitration cycle.

Figure 3B:
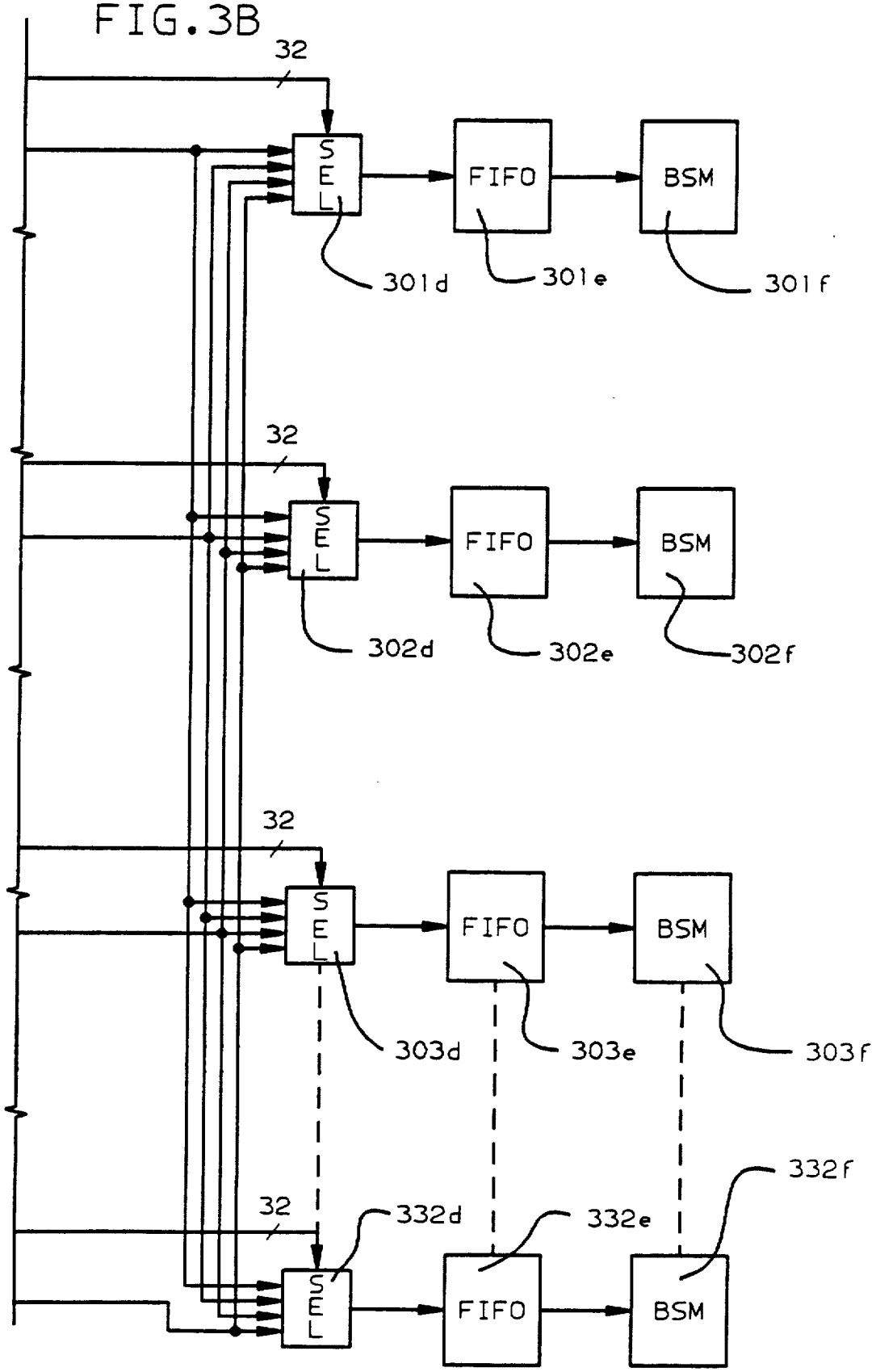

It can be seen that during one clock cycle four port requests can be distributed across the four BSMs, a maximum of four BSM selects can be serviced per clock cycle period. The minimum would be one BSM select per cycle where all port requests are for the same BSM. In accordance with another embodiment of the present invention to handle coupling of more processors to more basic storage modules such as 32 processors to 32 BSM's, for example, is shown in FIGS. 3A and 3B. In this embodiment each processor 301–332 provides a 5 -bit encoded request signal for each data block or packet to be applied to the BSM. The request code signal with its associated data packet is sequenced through the associated buffer. A decoder 301a–332a is at the output of each input buffer 301b–332b for decoding each 5-bit processor encoded request signal and providing a logic 1 request via lead on one of the 32 output lines to the appropriate arbitrator. For example, decoder 301a decodes the encoded output from buffer 301b indicating it's data to be applied to BSM 302f and provides a logic 1 on lead 400 or request to arbitrator 302c. The data at buffer 301b is then enabled through select switch 302d to memory BSM 302f via buffer 302e.

The arbitrators 301c–332c would be like FIG. 2 with 32 inputs and outputs instead of four input and outputs.

We claim:

1. A N×M switching matrix system with arbitration comprising:

M outputs ports;

N data inputs and request inputs from different sources, each request input associated with a data input and indicating which of M output ports the associated data is to be applied;

M arbitrators and M gating means, each arbitrator and associated gating means is coupled between said N data inputs and request inputs and a different one of said M output ports; and each of said arbitrator and gating means being responsive to said data inputs and request inputs for gating data input simultaneously to the requested output port when there is no contending request inputs for the same output port and for when there is contending request inputs for the same output port storing and sequencing the associated data inputs from said different sources to the associated output port on a round robin basis while simultaneously applying the non contending data inputs to the other output ports.

2. The system of claim 1 wherein the M arbitrators and M gating means include logic means which have a priority sequence for beginning the gating of the contending request signals out of the gating means.

3. The combination of claim 1 wherein the arbitrator means includes logic means producing a coded signal to the gating means which identifies the request input and said gating means is coupled directly to said data inputs and in response to said code signal from said aribtrator gates that input to the associated output port.

4. A multi-processor system for coupling an N plurality of processors to an M plurality of basic storage modules (BSM) comprising:

M basic storage modules;

N processors, each providing a data packet and a request code signal identifying which basic storage module said data packet is to be applied; and M arbitrator and M gating means with an arbitrator and associated gating means coupled and associated with each of said basic storage modules with each arbitrator and gating means coupled between said N processors and a different one of said Basic Storage Modules; said arbitrators and gating means responsive to said request signal and said data packet at its input for simultaneously gating associated data packets to its coupled basic storage module and when more than one request is received at a given cycle at any one of said arbitrators associated with basic storage module from said processors sequencing said data packets from said processors on a round robin basis to the associated basic storage module.

5. The combination of claim 4 wherein said arbitrator means includes logic means sequencing said gating means in accordance with a given priority.

6. The combination of claim 5 wherein each of said arbitrators produces code signals and said gating means is responsive to said data packets and said arbitrator provided code indicative of the associated processor for gating the appropriate processor input to the Basic Storage Module.

7. The combination of claim 6 above including a FIFO buffer means coupled between said processors and said arbitrators and gating means for storing and sequencing said data packets and request signals from said processors each clock cycle on a first in first out basis.

8. The combination of claim 7 above wherein said first buffer means has at least M stages.

9. The combination of claim 8 above including a second buffer means between each gating means and associated Basic Storage Module.

* * * * *